United States Patent Office 3,794,530

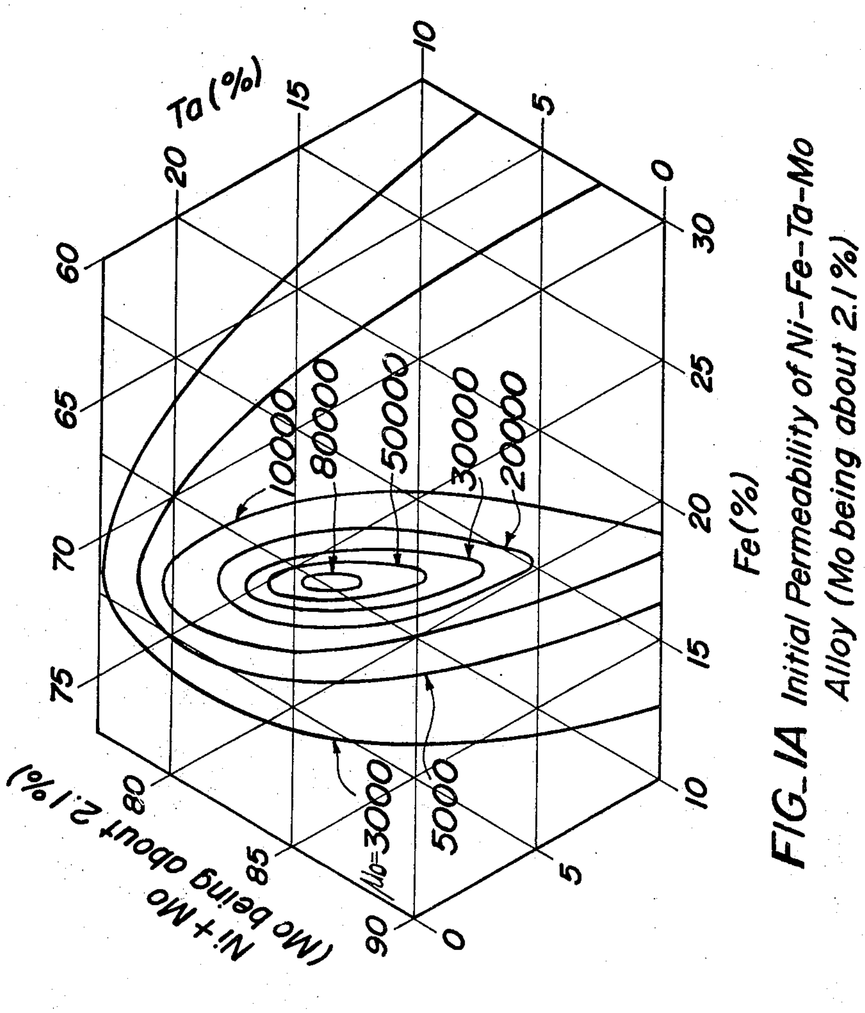
FIG_1A Initial Permeability of Ni-Fe-Ta-Mo Alloy (Mo being about 2.1%)

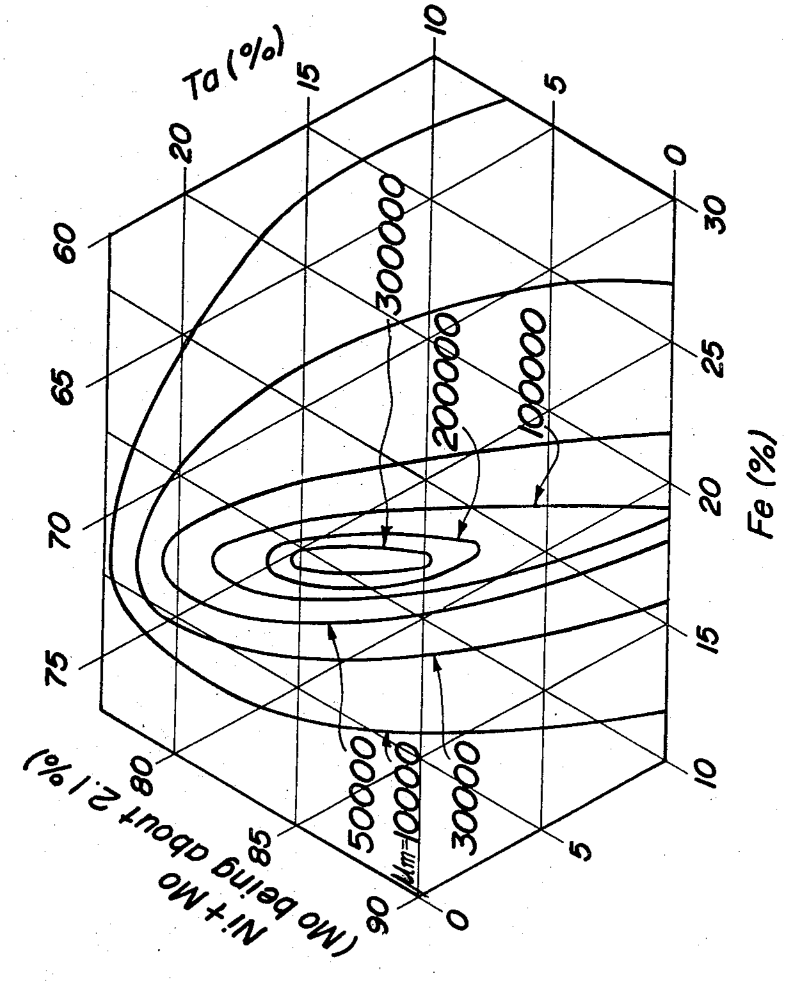
FIG_1B Maximum Permeability of Ni-Fe-Ta-Mo Alloy (Mo being about 2.1 %)

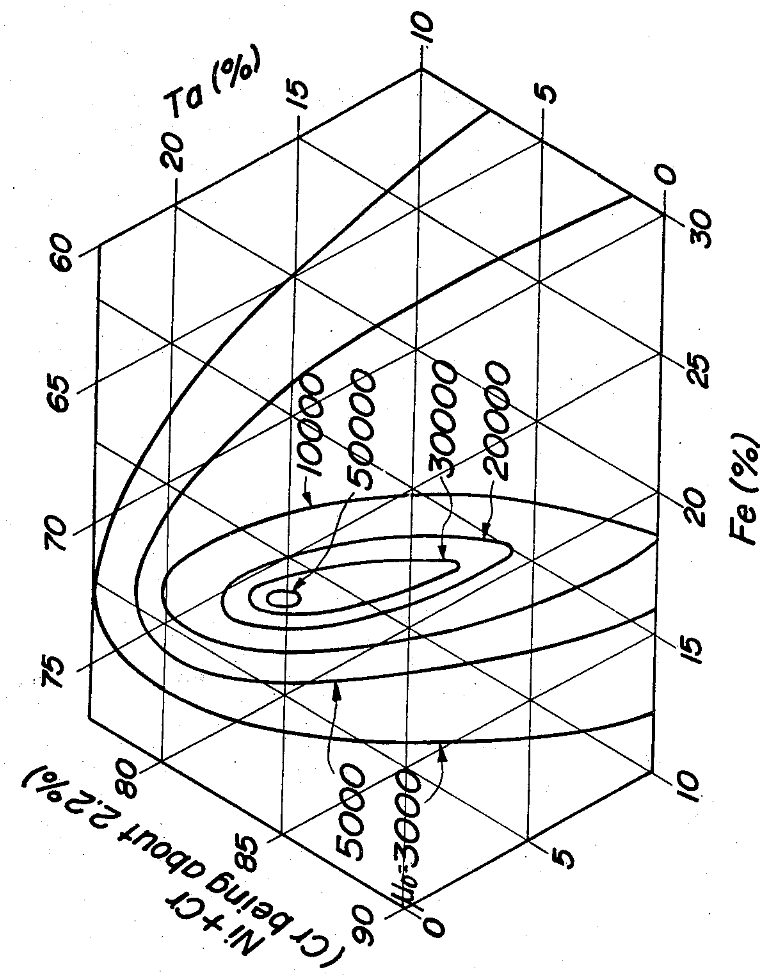
FIG. 2A Initial Permeability of Ni-Fe-Ta-Cr Alloy (Cr being about 2.2%)

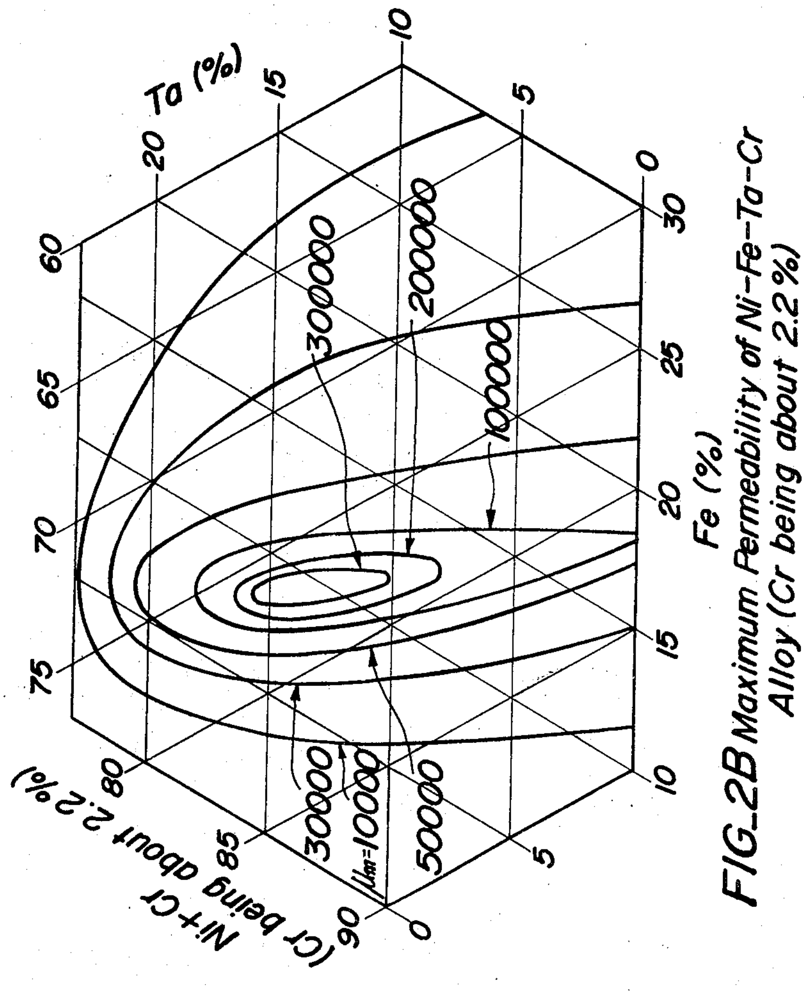
FIG.2B Maximum Permeability of Ni-Fe-Ta-Cr Alloy (Cr being about 2.2 %)

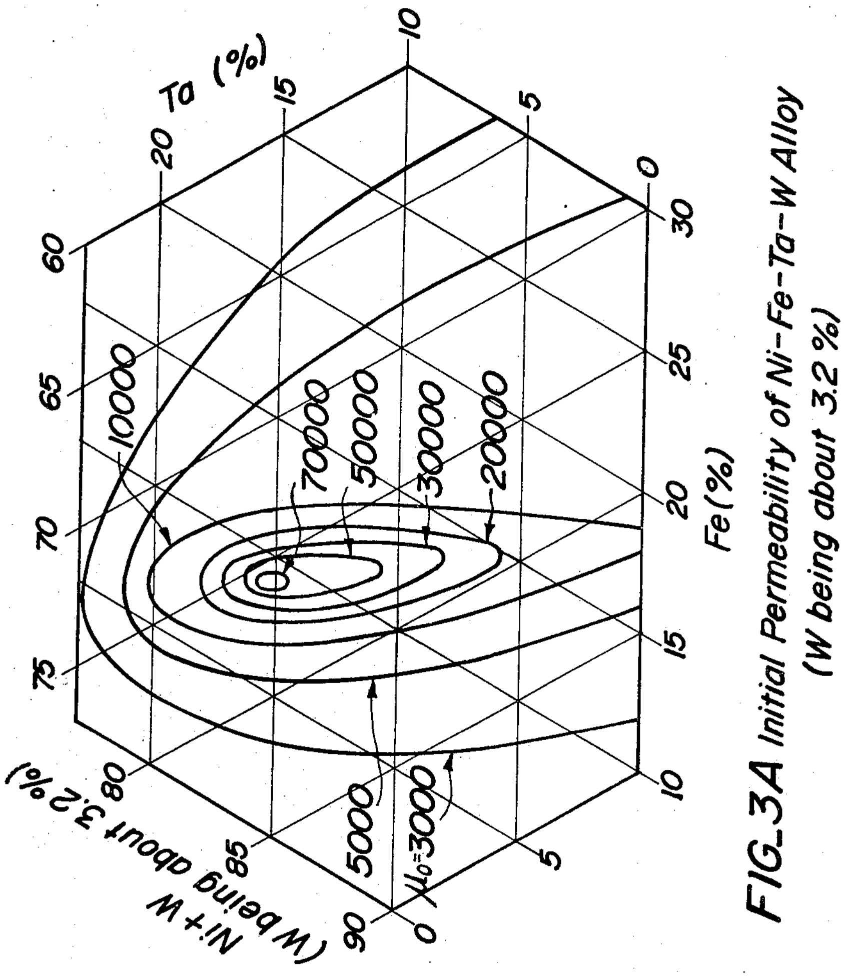
FIG. 3A Initial Permeability of Ni-Fe-Ta-W Alloy (W being about 3.2%)

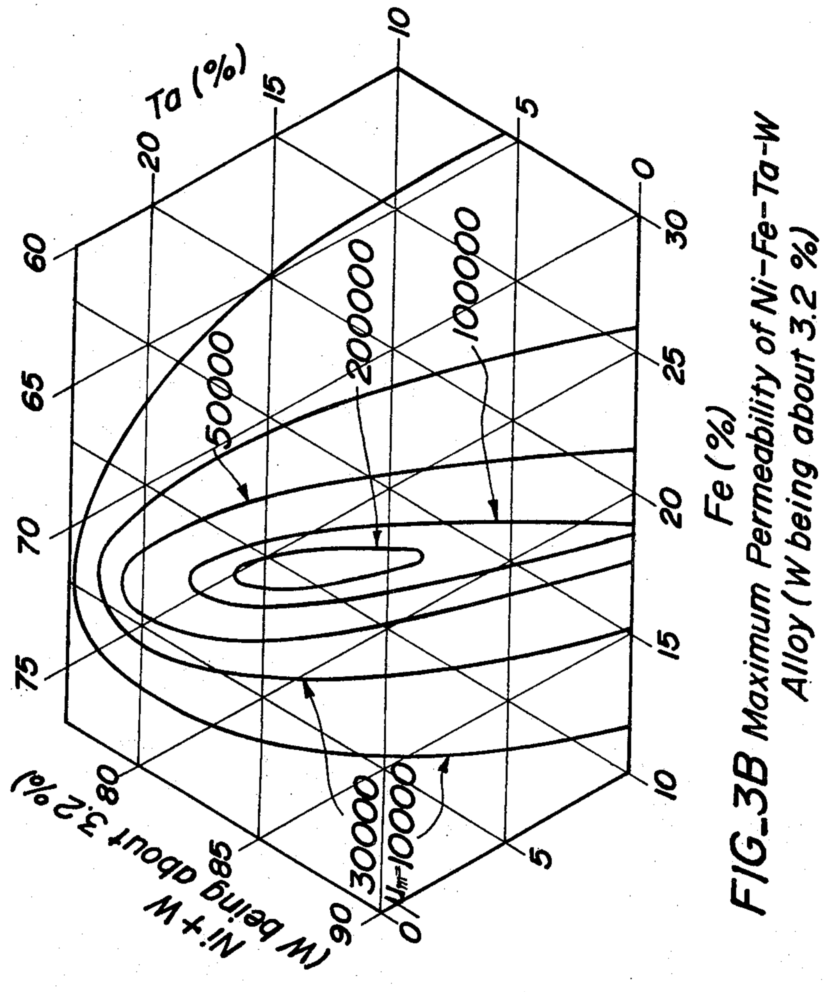
FIG_3B Maximum Permeability of Ni-Fe-Ta-W Alloy (W being about 3.2 %)

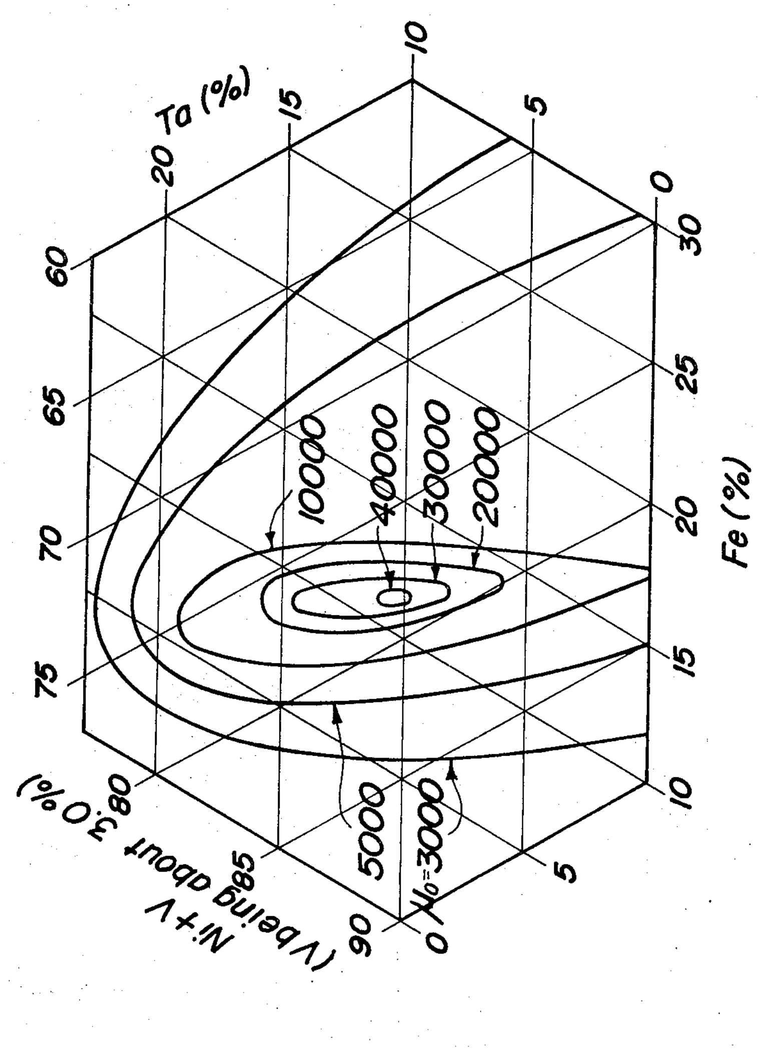
FIG_4A Initial Permeability of Ni-Fe-Ta-V Alloy
( V being about 3.0%)

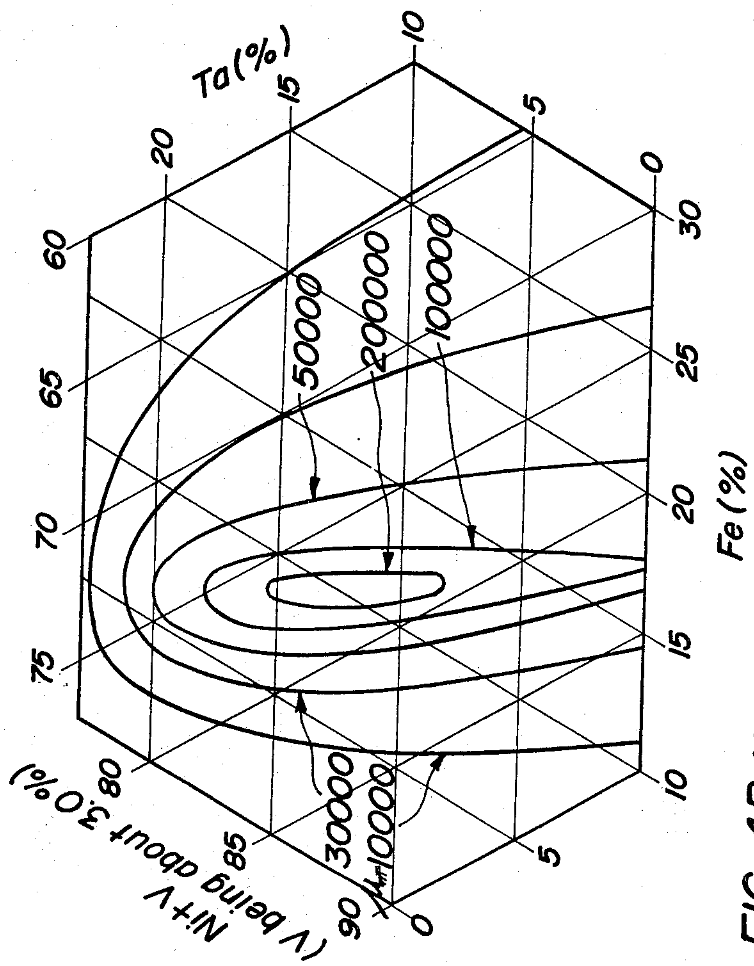
FIG_4B Maximum Permeability of Ni-Fe-Ta-V Alloy (V being about 3.0%)

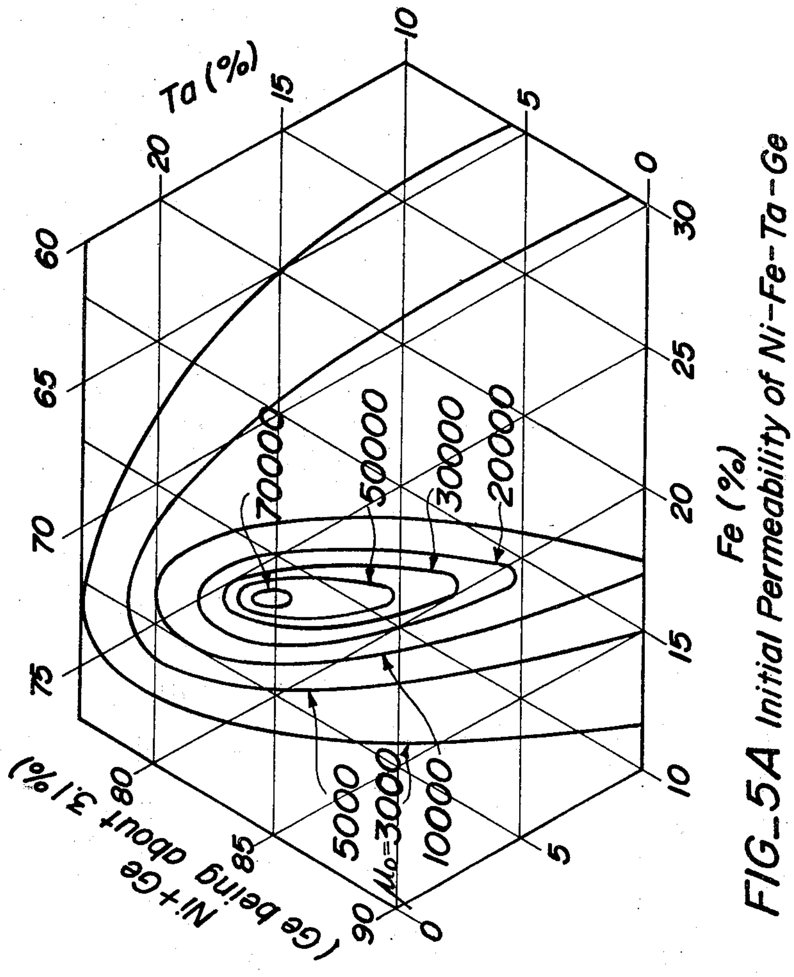
FIG_5A Initial Permeability of Ni-Fe-Ta-Ge Alloy (Ge being about 3.1%)

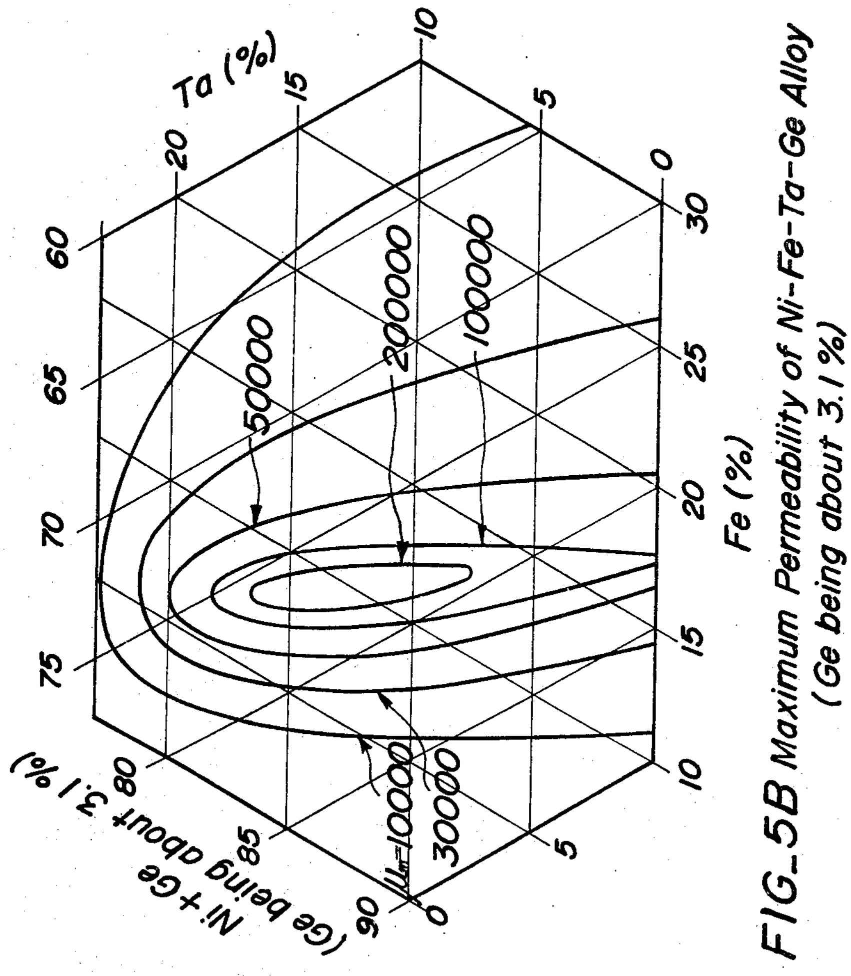
FIG_5B Maximum Permeability of Ni-Fe-Ta-Ge Alloy (Ge being about 3.1 %)

Patented Feb. 26, 1974

3,794,530

HIGH-PERMEABILITY Ni-Fe-Ta ALLOY FOR MAGNETIC RECORDING-REPRODUCING HEADS

Hakaru Masumoto, Sendai, Yuetsu Murakami, Izumimachi, and Masakatsu Hinai, Natori, Japan, assignors to The Foundation: The Research Institute of Electric and Magnetic Alloys, Sendai, Japan Filed Sept. 19, 1972, Ser. No. 290,424

Claims priority, application Japan, Oct. 13, 1971, 46/80,207

Int. Cl. C04b *35/00*; H01f *1/00*

U.S. Cl. 148—31.55 1 Claim

ABSTRACT OF THE DISCLOSURE

A magnetic recording and reproducing heads having a high permeability and high hardness, consisting of 60.2 to 85.0 wt. percent of nickel, 6.0 to 30.0 wt. percent of iron and 3.1 to 23.0 wt. percent of tantalum as the main ingredient, and a total amount of 0.01 to 10.0 wt. percent of at least one element selected from the group consisting of 0 to 7.0 wt. percent of molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt. percent of tin, 0 to 5.0 wt. percent of antimony, 0 to 10.0 wt. percent of cobalt and 0 to 10.0 wt. percent of copper as the subingredient, and an inevitable amount of impurities, characterized in that the alloy has the degree of order of 0.1 to 0.6, the Vickers hardness of more than 150, the initial permeability of more than 3,000 and maximum permeability of more than 5,000, and a method of manufacturing a magnetic recording and reproducing head having a high permeability, by heating said alloy articles at a temperature above 800° C. but lower than the melting point in a non-oxidizing atmosphere or in vacuo for at least more than 1 minute but not longer than 100 hours depending upon the composition, and cooling from a temperature of more than order-disorder transformation point to a room temperature at a suitable speed depending upon the composition so as to provide the degree of order of 0.1 to 0.6 and the Vickers hardness of more than 150.

This invention relates to a high-permeability alloy for magnetic recording-reproducing heads, which alloy consists of 60.2 to 85.0 wt. percent of nickel, 6.0 to 30.0 wt. percent of iron, 3.1 to 23.0 wt. percent of tantalum as the main ingredient, and further consists of the total amount of 0.01–10.0 wt. percent selected from the group consisting of 0 to 7.0 wt. percent of molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt. percent of tin, 0 to 5.0 wt. percent of antimony, 0 to 10. wt. percent of cobalt, and 0 to 10.0 wt. percent of copper as the subingredient, and an inevitable amount of impurities, and to provide a method of making the alloy with such composition and having a high permeability. The object of the present invention is to provide an alloy having a high permeability, a high hardness, a high specific resistivity and further a high forgeability and high workability through simple heat treatment, so as to provide a magnetic alloy for the use of magnetic recording-reproducing heads, having excellent magnetic property.

Permalloy (nickel-iron alloy) is widely used at the present in magnetic recording-reproducing heads of audio tape recorder, because it has a high permeability and high workability. The conventional Permalloy, however, has a shortcoming in that its Vickers hardness Hv is in the order of about 130 and comparatively low, so that its abrasion resistivity is rather poor. Accordingly, there has been a pressing need for improving the hardness and abrasion resistivity of alloy materials for magnetic recording-reproducing heads.

To achieve an object of the invention, the applicants have carried out a series of tests on alloys, which have a permeability higher than that of binary Permalloy and high hardness and high electric resistivity, while maintaining a high forgeability and high workability. As a result, the applicants have found out that, with the addition of 3.1 to 23.0 wt. percent of tantalum into nickel-iron alloys, magnetic and mechanical properties of the alloy can noticeably be improved.

The applicants have further found out that, with the addition of the total amount of less than 10.0 wt. percent of one or more than one of Mo, Cr, W, V, Nb, Mn, Ge, Ti, Zr, Al, Si, Sn, Sb, Co and Cu as the subingredient into nickel-iron-tantalum alloys and can provide an alloy having high permeability, high hardness and high specific resistivity, along with high forgeability and high workability.

According to the present invention, there is provided an alloy consisting of 60.2 to 85.0 wt. percent of nickel, 6.0 to 30.0 wt. percent of iron, and 3.1 to 23.0 wt. percent of tantalum as the main ingredient, and further consisting of the total amount of 0.01 to 10.0 wt. percent selected from the group consisting of 0 to 7.0 wt. percent of molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt. percent of tin, 0 to 5.0 wt. percent of antimony, 0 to 10.0 wt. percent of cobalt, and 0 to 10.0 wt. percent of copper as the subingredient, and an inevitable amount of impurities, which alloy has a high initial permeability, e.g., higher than 3,000, a high maximum permeability, e.g., higher than 5,000, a Vickers hardness greater than 150, a high specific resistivity, high forgeability and high workability. The alloy of the invention can easily be heat treated and formed into the shape of magnetic recording-reproducing heads.

According to the present invention, it is more preferable to provide an alloy consisting of 70.0 to 80.0 wt. percent of nickel, 8.0 to 20.0 wt. percent of iron and 6.0 to 17.0 wt. percent of tantalum as the main ingredient, and further consisting of the total amount of 0.01 to 10.0 wt. percent selected from the group consisting of 0 to 4.0 wt. percent of molybdenum, 0 to 3.0 wt. percent of chromium, 0 to 5.0 wt. percent of tungsten, 0 to 4.0 wt. percent of vanadium, 0 to 3.1 wt. percent of niobium, 0 to 5.0 wt. percent of manganese, 0 to 5.0 wt. percent germanium, 0 to 3.0 wt. percent of titanium, 0 to 3.0 wt. percent of zirconium, 0 to 3.0 wt. percent of aluminum, 0 to 3.0 wt. percent of silicon, 0 to 3.0 wt. percent of tin, 0 to 3.0 wt. percent of antimony, 0 to 5.0 wt. percent of cobalt, and 0 to 5.0 wt. percent of copper as the subingredient, and a small amount of impurities.

It is possible to obtain the alloy having the high permeability and the high hardness by a process comprising steps of heating the alloy in vacuo or in a non-oxidizing atmosphere, for the purpose of removal of work strain, thorough solution treatment and homogenization, at 800°

C. or higher, preferably 1,100° C. and lower than the melting point, for at least more than 1 minute, but not longer than about 100 hours depending on the alloy composition; cooling the alloy to a temperature above its order-disorder transformation point, e.g., about 600° C., so as to keep the alloy at the last-mentioned temperature for a short while until uniform temperature is established throughout the alloy; and cooling the alloy from the temperature above the order-disorder transformation point to room temperature at a rate faster than 1° C./hour but slower than 100° C./second depending on the alloy composition, or further heating the alloy at a temperature below the order-disorder transformation point for at least 1 minute but not longer than 100 hours depending on the alloy composition and cooling it to room temperature.

The reason why the heating temperature for the purpose of the aforesaid removal of work strain and thorough solution treatment is defined above 800° C., preferably above 1,100° C., is that the temperature above the recrystallizing temperature (about 600° C.) can improve the magnetic properties of the alloy, but the temperature above 800° C., preferably above 1,100° C., can result in an outstanding improvement of the magnetic properties of the alloy.

The manner in which the alloy is cooled from the temperature of solution treatment to a temperature above its order-disorder transformation point (about 600° C.) does not affect its magnetic properties so seriously, regardless of whether it is cooled slowly or quenched. The cooling speed when the alloy temperature becomes under its order-disorder transformation point has profound effects on the magnetic properties of the alloy, and hence, it is necessary to cool the alloy from its order-disorder transformation point at a rate faster than 1° C./hour but slower than 100° C./second depending on the alloy composition to a room temperature. Such range of the cooling speed is selected in order to cause the degree of order of the alloy to fall in a range of about 0.1 to 0.6, and the alloy having excellent magnetic properties can be obtained. If its degree of order is in a range of 0.2 to 0.5, the magnetic properties are further improved. If the alloy is comparatively quenched at about 100° C./second, its degree of order becomes comparatively small, e.g., at about 0.1, so that the magnetic properties of the alloy are deteriorated. If the alloy having such small degree of order is reheated at a temperature lower than the order-disorder transformation point, e.g., 200 to 600° C., the degree of order proceeds 0.1 to 0.6 and the magnetic properties are improved.

On the other hand, excessively slow cooling, slower than 1° C./hour, tends to make the degree of order too large in excess of 0.6, so that the magnetic properties are lowered.

The inventors have found that the magnetic properties of the alloy of the invention can be maximized when the degree of order of the alloy falls in a range of 0.1 to 0.6, preferably 0.2 to 0.5. The aforesaid cooling from a temperature above the order-disorder transformation point of the alloy at a rate faster than 1° C./hour but slower than 100° C./second will result in the desired degree of order in the range of 0.1 to 0.6. The magnetic properties of the alloy thus treated, especially when it is quenched, may be further improved by reheating it to a temperature below its order-disorder transformation point, e.g., in a range between 200° C. and 600° C.

Generally speaking, a higher treating temperature tends to allow a shorter treating time, while a lower treating temperature tends to require a longer treating time. Similarly, a greater mass tends to require a longer treating time, while a smaller mass tends to allow a shorter treating time.

In cooling the alloy having the aforesaid composition, according to the present invention, from a temperature above its order-disorder transformation point of about 600° C. to room temperature, the proper cooling speed for maximizing its high permeability somewhat varies depending on its composition, but the cooling speed to be used in the present invention is usually so slow that cooling in a furnace is preferred.

For instance, after shaping magnetic recording-reproducing heads, such heads are usually heat treated for eliminating internal stress caused in the heads by the shaping process. To retain their proper shape and to avoid the oxidation of their surface, slow cooling in vacuo or in a non-oxidizing atmosphere is preferable. The alloy according to the present invention is particularly suitable for such post-shaping heat treatment.

A method for making an alloy according to the invention will now be described step by step.

In order to make the alloy of the invention, a suitable amount of a starting material consisting of 60.2 to 85.0 wt. percent of nickel, 6.0 to 30.0 wt. percent of iron and 3.1 to 23.0 wt. percent of tantalum is melted by a melting furnace in air, preferably in vacuo or in a non-oxidizing atmosphere; a small amount (less than 1 wt. percent) of a deoxidizer and desulfurizer, e.g., manganese, silicon, aluminum, titanium, boron, calcium alloy, magnesium alloy, and the like, is added in the melt for removing impurities as far as possible; and an estimation of the total of less than 10.0 wt. percent selected from the group consisting of 0 to 7.0 wt. percent of molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt. percent of tin, 0 to 5.0 wt. percent of antimony, 0 to 10.0 wt. percent of cobalt and 0 to 10.0 wt. percent of copper, is further added to the melt; and the molten metal thus prepared is thoroughly agitated to homogenize its composition.

For the purpose of testing, a number of different alloy specimens were prepared in the aforesaid manner. Each of the alloy melt was poured into a mold having a several shape and size for producing a sound ingot. The ingot was then shaped into sheets, each being 0.3 mm. thick, by forging or rolling at a room temperature or a high temperature.

Rings with an outer diameter of 44 mm. and an inner diameter of 36 mm. were punched out of the sheets thus prepared. The rings were then heated at 800° C. or higher, preferably at above 1,100° C. but below the melting point, for at least 1 minute, preferably about 100 hours, in vacuo or in hydrogen or other non-oxidizing atmosphere, and then gradually cooled at a suitable cooling speed depending on the alloy composition such as 100° C./second to 1° C./hour, preferably 10° C./second to 10° C./hour. For certain alloy compositions, the specimens were further heated at a temperature below their order-disorder transformation point, i.e., lower than the order-disorder transformation point, particularly 200 to 600° C. for at least 1 minute but not longer than about 100 hours, and then cooled.

The permeability of the ring specimens thus obtained was measured by a conventional ballistic galvanometer method. The highest values of the initial permeability ($\mu_o$) and the maximum permeability ($\mu_m$) of the specimens proved to be 87,300 and 379,000, respectively. It was also found that the specimens had a considerably high hardness and a large specific resistivity.

For a better understanding of the invention, reference is made to the accompanying drawings, in which:

FIGS. 1A and 1B are graphs illustrating the relation between the composition of nickel-iron-tantalum-molybdenum alloys containing about 2.1 wt. percent of certain molybdenum, respectively, and their initial permeability and maximum permeability;

FIGS. 2A and 2B are graphs illustrating the relation between the composition of nickel-iron-tantalum-chromium alloys containing about 2.2 wt. percent of certain chromium, respectively, and their initial permeability and maximum permeability;

FIGS. 3A and 3B are graphs illustrating the relation between the composition of nickel-iron-tantalum-tungsten alloys containing about 3.2 wt. percent of certain tungsten, respectively, and their initial permeability and maximum permeability;

FIGS. 4A and 4B are graphs illustrating the relation between the composition of nickel-iron-tantalum-vanadium alloys containing about 3.0 wt. percent of certain vanadium, respectively, and their initial permeability and maximum permeability; and FIGS. 5A and 5B are graphs illustrating the relation between the composition of nickel-iron-tantalum-germanium alloys containing about 3.1 wt. percent of certain germanium, respectively, and their initial permeability and maximum permeability.

Embodiments of the present invention will be explained hereinafter.

EXAMPLE 1

Manufacture of alloy No. 21 (consisting of 74.0 wt. percent of Ni, 9.9 wt. percent of Fe, 14.0 wt. percent of Ta and 2.1 wt. percent of Mo)

As a starting material, 99.8%-pure electrolytic nickel, 99.9%-pure electrolytic iron, 99.9%-pure tantalum and 99.9%-pure molybdenum were used. A sample was formed by melting 800 g. of the starting pure metals in vacuo by using an alumina crucible disposed in a high-frequency electric induction furnace, agitating the molten metal so as to produce a homogeneous melt of the alloy, and pouring the melt into a metallic mold having a cylindrical hole of 25 mm. diameter and 170 mm. height. The ingot thus obtained was forged at about 1,000° C. into 7 mm. thick sheets. The sheets were hot rolled at about 600 to 900° C. to a thickness of 1 mm., and then cold rolled at a room temperature to make them into thin sheets of 0.3 mm. thickness. Rings with an inner diameter of 36 mm. and an outer diameter of 44 mm. were punched out from the thin sheets.

The rings thus formed were subjected to different heat treatments as shown in Table 1. Physical properties of the rings after the treatments are also show in Table 1.

TABLE 1

| Heat treatment | Initial permeability ($\mu_0$) | Maximum permeability ($\mu_m$) | Residual magnetic flux density (G) — Maximum magnetic flux density=5,000 G | Coercive force (Oe.) — Maximum magnetic flux density=5,000 G | Hysteresis loss (erg/cm.³/cycle) — Maximum magnetic flux density=5,000 G | Saturated magnetic flux density (G), magnetic field=900 Oe. | Specific electric resistance (μΩ-cm.) | Vickers hardness (Hv) |
|---|---|---|---|---|---|---|---|---|
| Heated at 1,150° C. in hydrogen for 3 hours, cooled to 600° C. in furnace, and cooled to room temperature at 9° C./second | 17,000 | 115,000 | 3,330 | 0.0164 | 27.31 | 5,550 | 72.5 | 204 |
| After said treatment, reheated at 400° C. in vacuo for 30 minutes | 33,000 | 215,000 | | | | | | |
| Heated at 1,150° C. in hydrogen for 3 hours, cooled to 600° C. in furnace, and cooled to room temperature at 8,100° C./hour | 38,900 | 174,000 | 3,310 | 0.0086 | 14.28 | 5,570 | 73.0 | 202 |
| After said treatment, reheated at 400° C. in vacuo for 1 hour | 41,000 | 206,000 | | | | | | |
| Heated at 1,150° C. in hydrogen for 3 hours, cooled to 600° C. in furnace, and cooled to room temperature at 240° C./hour | 62,000 | 293,000 | 3,280 | 0.0053 | 8.67 | 5,580 | 73.5 | 203 |
| After said treatment, reheated at 400° C. in vacuo for 30 minutes | 46,400 | 235,000 | | | | | | |
| Heated at 1,150° C. in hydrogen for 3 hours, cooled to 600° C. in furnace, and cooled to room temperature at 100° C./hour | 87,300 | 379,000 | 3,350 | 0.0041 | 6.45 | 5,600 | 73.4 | 202 |
| After said treatment, reheated at 400° C. in vacuo for 1 hour | 52,600 | 264,000 | | | | | | |
| Heated at 1,150° C. in hydrogen for 3 hours, cooled to 600° C. in furnace, and cooled to room temperature at 10° C./hour | 33,000 | 154,000 | 3,340 | 0.0093 | 16.46 | 5,570 | 73.2 | 202 |
| After said treatment, reheated at 400° C. in vacuo for 3 hours | 14,600 | 103,000 | 3,320 | 0.0170 | 28.60 | | | |

EXAMPLE 2

Manufacture of alloy No. 145 (consisting of 75.5 wt. percent of Ni, 11.1 wt. percent of Fe, 10.3 wt. percent of Ta and 3.1 wt. percent of Nb)

As a starting material, nickel, iron and tantalum each having the same purities as those in Example 1 and 99.8%-pure niobium were used. A method of manufacturing the sample was in a similar manner as Example 1. Different heat treatments were applied to the samples and the physical properties thereof were obtained as shown in Table 2.

TABLE 2

| Heat treatment | Initial permeability ($\mu_0$) | Maximum permeability ($\mu_m$) | Residual magnetic flux density (G) — Maximum magnetic flux density=5,000 G | Coercive force (Oe.) — Maximum magnetic flux density=5,000 G | Hysteresis loss (erg/cm.³/cycle) — Maximum magnetic flux density=5,000 G | Saturated magnetic flux density (G), magnetic field=900 Oe. | Specific electric resistance (μΩ-cm.) | Vickers hardness (Hv) |
|---|---|---|---|---|---|---|---|---|
| Heated at 1,150° C. in hydrogen for 3 hours, cooled to 600° C. in furnace, and cooled to room temperature at 26° C./second | 16,500 | 137,000 | 3,180 | 0.0164 | 18.42 | 6,010 | 69.3 | 218 |
| After said treatment, reheated at 400° C. in vacuo for 30 minutes | 34,000 | 183,000 | | | | | | |
| Heated at 1,150° C. in hydrogen for 3 hours, cooled to 600° C. in furnace, and cooled to room temperature at 8,100° C./hour | 42,000 | 235,000 | | | | 6,030 | 69.5 | 216 |
| After said treatment, reheated at 400° C. in vacuo for 1 hour | 50,100 | 246,000 | 3,130 | 0.0078 | 10.73 | | | |
| Heated at 1,150° C. in hydrogen for 3 hours, cooled to 600° C. in furnace, and cooled to room temperature at 800° C./hour | 63,600 | 316,000 | 3,140 | 0.0061 | 8.85 | 6,000 | 69.0 | 218 |
| After said treatment, reheated at 400° C. in vacuo for 30 minutes | 52,000 | 247,000 | | | | | | |
| Heated at 1,150° C. in hydrogen for 3 hours, cooled to 600° C. in furnace, and cooled to room temperature at 400° C./hour | 51,600 | 256,000 | 3,160 | 0.0075 | 10.24 | 6,000 | 69.2 | 220 |
| After said treatment, reheated at 400° C. in vacuo for 1 hour | 35,500 | 171,000 | | | | | | |
| Heated at 1,150° C. in hydrogen for 3 hours, cooled to 600° C. in furnace, and cooled to room temperature at 100° C./hour | 32,400 | 157,000 | 3,090 | 0.0103 | 12.47 | 6,010 | 68.7 | 218 |
| After said treatment, reheated at 400° C. in vacuo for 1 hour | 25,300 | 116,000 | 3,100 | 0.0120 | 14.63 | | | |

EXAMPLE 3

Manufacture of alloy No. 207 (consisting of 73.3 wt. percent of Ni, 8.2 wt. percent of Fe, 15.2 wt. percent of Ta and 3.1 wt. percent of Ge)

As a starting material, nickel, iron and tantalum each having the same purity as those in Example 1 and 99.9%-pure germanium were used. A method of manufacturing the sample was in the similar manner as Example 1. Different heat treatments were applied to the samples and the physical properties thereof were obtained as shown in Table 3.

In the above examples, the metals V and Nb having a purity of 99.8% were used, but conventional ferro-vanadium and ferro-niobium available on the market can be used. In such a case, an alloy slightly becomes fragile, so that a deoxidizer and desulfurizer, e.g., manganese, silicon, aluminum, titanium, boron, calcium alloy, magnesium alloy and the like, are suitably used to carry out deoxidation and desulfurization sufficiently and to give malleability to the alloy.

TABLE 3

| Heat treatment | Initial permeability ($\mu_o$) | Maximum permeability ($\mu_m$) | Residual magnetic flux density (G) | Coercive force (Oe.) | Hysteresis loss (erg/cm.$^3$/cycle) | Saturated magnetic flux density (G), magnetic field=900 Oe. | Specific electric resistance ($\mu\Omega$-cm.) | Vicker hardness (Hvs) |
|---|---|---|---|---|---|---|---|---|
| | | | Maximum magnetic flux density=5,000 G | | | | | |
| Heated at 1,150° C. in hydrogen for 3 hours, cooled to 600° C. in furnace, and cooled to room temperature at 9° C./second | 17,800 | 103,000 | 3,070 | 0.0162 | 25.30 | 5,710 | 72.5 | 265 |
| After said treatment, reheated at 400° C. in vacuo for 30 minutes | 28,000 | 154,000 | | | | | | |
| Heated at 1,150° C. in hydrogen for 3 hours, cooled to 600° C. in furnace, and cooled to room temperature at 8,100° C. /hour | 36,400 | 175,000 | 3,090 | 0.0125 | 19.69 | 5,700 | 72.7 | 263 |
| After said treatment, reheated at 400° C. in vacuo for 1 hour | 47,200 | 203,000 | 3,150 | 0.0098 | 17.62 | | | |
| Heated at 1,150° C. in hydrogen for 3 hours, cooled to 600° C. in furnace, and cooled to room temperature at 800° C./hour | 53,600 | 224,000 | 3,100 | 0.0086 | 15.48 | 5,710 | 72.4 | 265 |
| After said treatment, reheated at 400° C. in vacuo for 30 minutes | 58,800 | 232,000 | | | | | | |
| Heated at 1,150° C. in hydrogen for 3 hours, cooled to 600° C. in furnace, and cooled to room temperature at 240° C./hour | 72,500 | 287,000 | 3,130 | 0.0074 | 12.83 | 5,730 | 72.2 | 265 |
| After said treatment, reheated at 400° C. in vacuo for 1 hour | 53,000 | 241,000 | | | | | | |
| Heated at 1,150° C. in hydrogen for 3 hours, cooled to 600° C. in furnace, and cooled to room temperature at 100° C./hour | 46,600 | 216,000 | 3,120 | 0.0094 | 16.70 | 5,710 | 72.6 | 267 |
| After said treatment, reheated at 400° C. in vacuo for 1 hour | 23,700 | 157,500 | | | | | | |

EXAMPLE 4

Manufacture of alloy No. 228 (consisting of 74.0 wt. percent of Ni, 8.9 wt. percent of Fe, 15.1 wt. percent of Ta and 2.0 wt. percent of Ti)

As a starting material, nickel, iron, and tantalum each having the same purity as those in Example 1 and 99.8%-pure titanium were used. A method of manufacturing the sample was in the similar manner as Example 1. Different heat treatments were applied to the samples and the physical properties thereof were obtained as shown in Table 4.

Further, in the above examples, each alloy was heated at 1,150° C. for 3 hours, cooled to 600° C. in a furnace, and further treated by various heat treatments. This heating temperature can be more than 800° C., preferably above 1,100° C. and below the melting point, and the heating time is not limited.

Further, the characteristics of the typical alloys are as shown in Table 5.

TABLE 4

| Heat treatment | Initial permeability ($\mu_o$) | Maximum permeability ($\mu_m$) | Residual magnetic flux density (G) | Coercive force (Oe.) | Hysteresis loss (erg/cm.$^3$/cycle) | Saturated magnetic flux density (G), magnetic field=900 Oe. | Specific electric resistance ($\mu\Omega$-cm.) | Vickers hardness (Hv) |
|---|---|---|---|---|---|---|---|---|
| | | | Maximum magnetic flux density=5,000 G | | | | | |
| Heated at 1,150° C. in hydrogen for 3 hours, cooled to 600° C. in furnace, and cooled to room temperature at 26° C./second | 10,600 | 147,000 | 3,160 | 0.0196 | 33.47 | 6,120 | 72.0 | 303 |
| After said treatment, reheated at 400° C. in vacuo for 30 minutes | 25,000 | 217,000 | | | | | | |
| Heated at 1,150° C. in hydrogen for 3 hours, cooled to 600° C. in furnace, and cooled to room temperature at 8,100° C./hour | 22,000 | 254,000 | | | | 6,150 | 72.2 | 304 |
| After said treatment, reheated at 400° C. in vacuo for 1 hour | 28,300 | 262,000 | 3,130 | 0.0140 | 25.24 | | | |
| Heated at 1,150° C. in hydrogen for 3 hours, cooled to 600° C. in furnace, and cooled to room temperature at 240° C./hour | 39,400 | 271,500 | 3,140 | 0.0095 | 17.53 | 6,160 | 72.0 | 305 |
| After said treatment, reheated at 400° C. in vacuo for 30 minutes | 31,600 | 246,000 | | | | | | |
| Heated at 1,150° C. in hydrogen for 3 hours, cooled to 600° C. in furnace, and cooled to room temperature at 100° C./hour | 25,000 | 198,000 | 3,120 | 0.0120 | 22.60 | 6,140 | 71.8 | 303 |
| After said treatment, reheated at 400° C. in vacuo for 1 hour | 20,400 | 136,000 | | | | | | |
| Heated at 1,150° C. in hydrogen for 3 hours, cooled to 600° C. in furnace, and cooled to room temperature at 10° C./hour | 18,600 | 133,500 | 3,100 | 0.0164 | 25.37 | 6,120 | 71.5 | 300 |
| After said treatment, reheated at 400° C. in vacuo for 1 hour | 13,500 | 104,000 | 3,080 | 0.0203 | 28.64 | | | |

TABLE 5

| Alloy No. | Composition (percent) Ni | Fe | Ta | Mo | Cooling speed from 600° C. after heating at 1,150° C. (° C./hour) | Reheating temperature, °C. (hour) | Initial permeability ($\mu_m$) | Maximum permeability ($\mu_m$) | Residual magnetic flux density (G) — Maximum magnetic flux density=5,000 G | Coercive force (Oe.) — Maximum magnetic flux density=5,000 G | Hysteresis loss (erg/cm.³/cycle) — Maximum magnetic flux density=5,000 G | Saturated magnetic flux density (G), Magnetic field=900 Oe. | Specific electric resistance (μΩ-cm.) | Vickers hardness (Hv) |
|---|---|---|---|---|---|---|---|---|---|---|---|---|---|---|
| 5 | 76.3 | 12.6 | 5.1 | 6.0 | 240 | 420 (80) | 13,000 | 104,000 | 3,970 | 0.0190 | 29.42 | | | 155 |
| 12 | 76.0 | 11.6 | 8.2 | 4.2 | 240 | | 75,200 | 325,000 | 3,120 | 0.0065 | 9.75 | 5,580 | 68.6 | 164 |
| 21 | 74.0 | 9.9 | 14.0 | 2.1 | 100 | | 87,300 | 379,000 | 3,350 | 0.0041 | 6.45 | 5,600 | 73.4 | 202 |
| 29 | 73.2 | 7.5 | 18.3 | 1.0 | 100 | | 36,700 | 180,400 | 2,840 | 0.0110 | 16.53 | 5,420 | 78.6 | 225 |
| | | | | Cr | | | | | | | | | | |
| 38 | 76.5 | 14.0 | 5.0 | 4.5 | 240 | 400 (50) | 18,200 | 134,000 | 3,260 | 0.0136 | 18.32 | 6,570 | 68.4 | 156 |
| 45 | 76.0 | 10.8 | 10.0 | 3.2 | 10 | | 38,100 | 251,000 | 3,020 | 0.0074 | 12.61 | 6,330 | 70.8 | 172 |
| 52 | 74.3 | 8.3 | 15.2 | 2.2 | 50 | | 53,100 | 337,000 | 2,960 | 0.0059 | 9.30 | 6,250 | 77.1 | 220 |
| 60 | 71.5 | 7.2 | 20.3 | 1.0 | 100 | | 16,000 | 96,000 | 2,870 | 0.0202 | 35.74 | 5,130 | 80.3 | 270 |
| | | | | W | | | | | | | | | | |
| 71 | 75.0 | 12.5 | 4.0 | 8.5 | 240 | 400 (30) | 14,000 | 50,200 | 3,620 | 0.0206 | 40.55 | | | 151 |
| 78 | 74.0 | 9.7 | 10.3 | 6.0 | 5 | | 46,300 | 188,000 | 3,470 | 0.0113 | 17.47 | 7,040 | 62.5 | 127 |
| 86 | 72.5 | 9.3 | 15.0 | 3.2 | 100 | | 72,500 | 274,000 | 3,150 | 0.0066 | 10.13 | 6,790 | 65.1 | 225 |
| 93 | 70.5 | 8.0 | 20.5 | 1.0 | 240 | | 8,400 | 49,700 | 2,740 | 0.0242 | 38.60 | 5,010 | 101.7 | 270 |
| | | | | V | | | | | | | | | | |
| 101 | 76.0 | 14.0 | 3.5 | 6.5 | 100 | 420 (10) | 10,500 | 65,200 | 3,170 | 0.0235 | 37.44 | | | 187 |
| 108 | 76.5 | 11.2 | 7.0 | 5.3 | 100 | | 26,000 | 174,000 | 3,010 | 0.0142 | 24.63 | 5,880 | 88.0 | 235 |
| 113 | 75.4 | 11.4 | 10.2 | 3.0 | 400 | | 40,900 | 291,300 | 3,180 | 0.0084 | 13.05 | 5,920 | 85.6 | 229 |
| 120 | 73.0 | 9.8 | 16.0 | 1.2 | 240 | | 13,800 | 104,500 | 2,960 | 0.0175 | 28.12 | 5,760 | 86.3 | 222 |
| | | | | Nb | | | | | | | | | | |
| 145 | 75.5 | 11.1 | 10.3 | 3.1 | 800 | | 63,600 | 316,000 | 3,140 | 0.0061 | 8.85 | 6,000 | 69.0 | 218 |
| 153 | 73.0 | 10.7 | 15.2 | 1.1 | 240 | | 34,200 | 182,500 | 3,090 | 0.0106 | 13.45 | 6,080 | 75.4 | 223 |
| | | | | Mn | | | | | | | | | | |
| 160 | 77.2 | 9.1 | 5.2 | 8.5 | 800 | | 7,400 | 73,000 | 3,530 | 0.0283 | 46.56 | | | 156 |
| 167 | 75.0 | 8.9 | 10.0 | 6.1 | 400 | | 20,900 | 136,000 | 3,460 | 0.0102 | 13.10 | 7,010 | 59.6 | 174 |
| 175 | 73.5 | 7.2 | 15.3 | 4.0 | 240 | | 45,700 | 264,000 | 3,320 | 0.0079 | 10.57 | 6,750 | 63.2 | 253 |
| 182 | 70.2 | 7.1 | 20.5 | 2.2 | 240 | | 9,600 | 58,000 | 2,650 | 0.0196 | 37.24 | 5,020 | 105.4 | 272 |
| | | | | Ge | | | | | | | | | | |
| 190 | 77.4 | 11.4 | 5.2 | 6.0 | 240 | | 19,200 | 124,000 | 3,460 | 0.0135 | 21.46 | | | 163 |
| 197 | 76.0 | 8.5 | 10.0 | 5.5 | 240 | | 48,300 | 216,000 | 3,070 | 0.0092 | 16.31 | 5,960 | 68.4 | 220 |
| 207 | 73.3 | 8.2 | 15.2 | 3.1 | 240 | | 72,500 | 287,000 | 3,130 | 0.0074 | 12.83 | 5,730 | 72.2 | 265 |
| 214 | 71.0 | 7.5 | 20.3 | 1.2 | 100 | | 16,400 | 73,500 | 2,530 | 0.0120 | 36.05 | 5,000 | 102.3 | 273 |
| | | | | Ti | | | | | | | | | | |
| 221 | 76.5 | 10.0 | 10.2 | 3.3 | 240 | | 20,100 | 136,000 | 3,250 | 0.0131 | 27.32 | 6,510 | 67.3 | 284 |
| 228 | 74.0 | 8.9 | 15.1 | 2.0 | 240 | | 39,400 | 271,500 | 3,140 | 0.0095 | 17.53 | 6,160 | 72.0 | 305 |
| 236 | 73.5 | 8.2 | 17.2 | 1.1 | 240 | | 10,700 | 67,100 | 2,810 | 0.0204 | 38.21 | 5,270 | 80.5 | 317 |
| | | | | Zr | | | | | | | | | | |
| 244 | 77.2 | 14.3 | 5.0 | 3.5 | 100 | | 6,300 | 58,000 | 3,530 | 0.0264 | 46.52 | | | 185 |
| 252 | 76.0 | 11.7 | 10.3 | 2.0 | 100 | | 11,500 | 120,000 | 3,360 | 0.0184 | 23.77 | 7,230 | 67.0 | 230 |
| 260 | 73.3 | 10.5 | 15.2 | 1.0 | 240 | | 27,800 | 264,000 | 3,230 | 0.0136 | 18.40 | 7,150 | 69.3 | 268 |
| | | | | Al | | | | | | | | | | |
| 268 | 79.5 | 11.2 | 5.1 | 4.2 | 800 | | 7,900 | 55,000 | 3,250 | 0.0241 | 33.46 | | | 310 |
| 275 | 77.0 | 10.6 | 10.3 | 2.1 | 800 | | 35,300 | 283,000 | 3,170 | 0.0095 | 14.25 | 6,330 | 59.7 | 380 |
| 283 | 73.2 | 8.3 | 17.5 | 1.0 | 400 | | 14,800 | 108,000 | 3,080 | 0.0146 | 18.54 | 5,970 | 78.4 | 396 |
| | | | | Si | | | | | | | | | | |
| 294 | 78.5 | 9.7 | 7.3 | 4.5 | 100 | | 16,900 | 123,000 | 3,460 | 0.0192 | 26.01 | | | 210 |
| 302 | 75.1 | 7.7 | 15.2 | 2.0 | 240 | | 46,000 | 307,000 | 3,240 | 0.0071 | 12.63 | 6,120 | 75.4 | 286 |
| 310 | 72.0 | 6.3 | 20.2 | 1.2 | 240 | | 8,500 | 74,200 | | | | 4,870 | 112.5 | 290 |
| | | | | Sn | | | | | | | | | | |
| 317 | 77.5 | 13.1 | 5.1 | 4.3 | 240 | 400 (5) | 10,300 | 62,000 | 3,510 | 0.0270 | 43.68 | | | 210 |
| 315 | 76.0 | 11.7 | 10.3 | 2.0 | 240 | | 35,000 | 258,000 | 3,370 | 0.0125 | 21.34 | 7,280 | 64.5 | 239 |
| 323 | 73.5 | 10.2 | 15.2 | 1.1 | 100 | | 21,600 | 146,000 | 3,200 | 0.0203 | 32.50 | 6,140 | 72.3 | 252 |
| | | | | Sb | | | | | | | | | | |
| 331 | 77.5 | 13.1 | 5.2 | 4.2 | 240 | 400 (10) | 12,400 | 75,000 | 3,570 | 0.0285 | 44.21 | | | 203 |
| 340 | 76.5 | 11.4 | 10.0 | 2.1 | 100 | | 37,000 | 261,000 | 3,300 | 0.0134 | 23.64 | 7,130 | 65.6 | 245 |
| 348 | 74.0 | 9.5 | 15.2 | 1.3 | 240 | | 18,400 | 135,000 | 3,150 | 0.0170 | 30.38 | 6,110 | 74.5 | 261 |
| | | | | Co | | | | | | | | | | |
| 356 | 76.5 | 9.3 | 5.2 | 9.0 | 10 | 450 (50) | 7,500 | 48,000 | 3,640 | 0.0370 | 47.07 | | | 164 |
| 363 | 75.0 | 9.9 | 10.0 | 5.1 | 100 | | 21,500 | 137,000 | 3,560 | 0.0146 | 23.40 | 8,300 | 60.3 | 177 |
| 370 | 71.5 | 10.1 | 15.2 | 3.2 | 240 | | 44,000 | 280,600 | 3,240 | 0.0073 | 12.52 | 7,730 | 67.3 | 233 |
| 375 | 70.0 | 8.5 | 20.5 | 1.0 | 240 | | 13,300 | 96,000 | 2,780 | 0.0185 | 26.63 | 5,120 | 105.1 | 275 |
| | | | | Cu | | | | | | | | | | |
| 380 | 77.0 | 8.2 | 5.3 | 9.5 | 100 | 400 (10) | 9,700 | 85,000 | 3,410 | 0.0315 | 38.64 | | | 166 |
| 385 | 75.5 | 9.3 | 10.2 | 5.0 | 240 | | 21,500 | 138,000 | 3,270 | 0.0174 | 29.07 | 7,800 | 57.2 | 183 |
| 393 | 73.2 | 8.6 | 15.0 | 3.2 | 240 | | 38,600 | 273,000 | 3,050 | 0.0104 | 22.52 | 6,740 | 65.7 | 244 |
| 400 | 70.5 | 8.0 | 20.5 | 1.0 | 100 | | 16,500 | 82,400 | 2,660 | 0.0260 | 35.71 | 5,100 | 102.0 | 272 |

As understood from the examples, figures and Table 5, in the Ni-Fe-Ta alloy added with the total amount of more than 0.01% and less than 10.0% selected from the group consisting of Mo, Cr, W, V, Nb, Mn, Ge, Ti, Zr, Al, Si, Sn, Sb, Co and Cu according to the present invention, the highest values of the initial permeability and the maximum permeability are very large, for instance, the alloy (No. 21 in Table 5) consisting of 74.0 wt. percent of nickel, 9.9 wt. percent of iron, 14.0 wt. percent of tantalum and 2.1 wt. percent of molybdenum heated at 1,150° C. for 3 hours, cooled to 600° C. in a furnace, maintained at the same temperature for 10 minutes, and further cooled to a room temperature at 100° C./hour, which initial permeability and the maximum permeability are 87,300 and 379,000, respectively, and its hardness Hv is 202. These characteristics of the Ni-Fe-Ta alloys are remarkable as compared with the alloy consisting of 73.0 wt. percent of Ni, 12.0 wt. percent of Fe and 15.0 wt. percent of Ta and the alloy consisting of 75.5 wt. percent of Ni, 13.5 wt. percent of Fe and 11.0 wt. percent of Ta, which are heated at 1,250° C. for 3 hours, cooled to 600° C. in a furnace, maintained at the same temperature for 10 minutes, and further cooled to a room temperature at 400° C./hour and 240° C./hour. The initial permeability (the former alloy) is 34,800 and the maximum permeability (the latter alloy) is 256,000 and the hardness Hv=210 and 192, respectively.

As described in the foregoing, with the method according to the present invention, the heat treatment may be completed only by a primary treatment, which consists of heating a ternary alloy with a composition falling in the specific range of the invention, in a non-oxidizing atmosphere or in vacuo at 800° C. or higher, preferably above 1,100° C., but lower than the melting point, for at least 1 minute, but not longer than about 100 hours, depending on the alloy composition, gradually cooling the alloy in furnace to about 600° C., and then cooling the alloy from about 600° C. to room temperature at a cooling speed of 100° C./second to 1° C./hour, preferably 10° C./second to 10° C./hour, depending on the alloy composition.

According to the present invention, it is also preferable to apply a secondary heat treatment to the alloy treated by the aforesaid primary heat treatment, which secondary heat treatment comprises steps of heating the alloy in a non-oxidizing atmosphere or in vacuo at a temperature below the order-disorder transformation point of the alloy, i.e., at about 600° C., for at least 1 minute, but not longer than 100 hours, and then gradually cooling.

The secondary heat treatment is carried out after cooling the alloy to a room temperature at a suitable speed depending on the alloy composition from about 600° C. at the primary heat treatemnt, but it can be carried out after cooling the alloy to a preferable temperature of less than the order-disorder transformation point but more than the room temperature at a suitable speed from about 600 C. at the primary heat treatment.

Conventional materials for magnetic recording and reproducing heads have a shortcoming in that the passage of magnetic tape in contact with such heads tends to abrade the heads, which head abrasion may cause deterioration of the quality of the signals, e.g., sound quality, recorded or reproduced by the head.

Accordingly, the alloy for magnetic heads should preferably have a high hardness and a high abrasion resistivity. Conventional nickel-iron alloys for magnetic heads have a Vickers hardness Hv in the order of about 130, which is not high enough for ensuring a high abrasion resistivity. On the other hand, the Vickers hardness of the alloy according to the present invention increases with the addition of the total amount of 0.01 to 10.0% selected from the group consisting of Mo, Cr, W, V, Nb, Mn, Ge, Ti, Zr, Al, Si, Sn, Sb, Co and Cu, as shown in the examples and Table 5, and a Vickers hardness Hv as high as 151 to 396 can be obtained. Thus, the abrasion resistivity of magnetic material for recording and reproducing heads is noticeably improved by the present invention. The most important characteristics of the alloy according to the present invention is the highest hardness.

The electric resistivity of magnetic recording and reproducing heads should preferably be high for suppressing the eddy current loss therein. The specific resistivity of conventional binary alloy consisting of 79 wt. percent of nickel and 21 wt. percent of iron is in the order of 16 $\mu\Omega$-cm. On the other hand, with the alloys according to the present invention, the specific resistivity is as high as 57 to 112 $\mu\Omega$-cm. as can be seen from the examples and Table 5. This high specific resistivity is also one of the characteristics of the alloy according to the present invention.

Magnetic heads are usually made by laminating thin sheets of the alloy material, which sheets are in turn formed by rolling and cutting into suitable shape by punching. Thus, the alloy for magnetic heads should have a high workability. The alloys according to the present invention are as easily workable as conventional nickel-iron binary alloy; namely, the alloy of the invention can easily be forged, rolled, drawn, swaged, or punched.

The high hardness of the alloy according to the present invention makes the alloy particularly suitable for magnetic recording and reproducing heads, as pointed out in the foregoing. Furthermore, the outstandingly high permeability and the high specific resistivity of the alloy of the invention are also attractive in conventional electric and magnetic devices of various other types.

According to the present invention, the contents of nickel, iron and tantalum are restricted to 60.2 to 85.0 wt. percent, 6.0 to 30.0 wt. percent and 3.1 to 23.0 wt. percent, respectively, and further the contents of the subingredients added thereto are restricted to 0.01 to 10.0 wt. percent selected from the group consisting of 0 to 7.0 wt. percent of molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt percent of tin, 0 to 5.0 wt. percent of antimony, 0 to 10.0 wt. percent of cobalt, and 0 to 10.0 wt. percent of copper. The reason why the content of alloys according to the present invention is restricted is that the alloy composition in the aforesaid range shows a high permeability and a high hardness suitable for magnetic heads, but the alloy composition outside the aforesaid range shows the decrease of permeability and hardness to use the alloy for magnetic heads.

The suitable contents of the ingredients in the alloy according to the present invention will now be described in further detail.

(1) Nickel=60.2 to 85.0 wt. percent

With the nickel content of 60.2 to 85.0 wt. percent, excellent magnetic properties can be achieved, i.e., an initial permeability $\mu_0$ of 87,300 and a maximum permeability $\mu_m$ of 379,000. With the nickel content less than 60.2 wt. percent, the initial permeability $\mu_0$ and the maximum permeability $\mu_m$ are reduced to levels below 3,000 and 5,000, respectively. On the other hand, with the nickel content in excess of 85.0 wt. percent, the initial permeability $\mu_0$ becomes less than 3,000, despite that a comparatively high maximum permeability $\mu_m$ can be achieved. Thus, the nickel content is restricted to 60.2 to 85.0 wt. percent. Further the preferable range of the nickel content is 70.0 to 80.0 wt percent.

(2) Iron=6.0 to 30.0 wt. percent

With the iron content of 6.0 to 30.0 wt. percent, excellent magnetic properties can be obtained. On the other hand, with the iron content of less than 6.0 wt. percent, the initial permeability $\mu_0$ and the maximum permeability $\mu_m$ are always below 3,000 and 5,000, respectively. Further, with the iron content in excess of 30.0 wt. percent, the initial permeability $\mu_0$ and the maximum permeability $\mu_m$ are also reduced to levels below 3,000 and 5,000, respectively. Thus, the iron content is restricted to 6.0 to 30.0 wt. percent. Further, the preferable range of the iron content is 8.0 to 20.0 wt. percent.

(3) Tantalum=3.1 to 23.0 wt. percent

With the tantalum content in the aforesaid range, excellent magnetic properties and high hardness can be obtained. On the other hand, with the tantalum content of less than 3.1 wt. percent, it becomes difficult to ensure the Vickers hardness Hv to be not smaller than 150. When the tantalum content increases in excess of 23.0 wt. percent, the initial permeability $\mu_0$ and the maximum permeability $\mu_m$ becomes smaller than 3,000 and 5,000, respectively. The excessively high tantalum content also results in the deterioration of the workability of the alloy, especially its forgeability and rollability. Thus, the tantalum content is restricted to 3.1 to 23.0 wt. percent. Further, the preferable range of the tantalum content is 6.0 to 17.0 wt. percent.

(4) Molybdenum=0 to 7.0 wt. percent (exclusive of 0%)

With the molybdenum content of 0 to 7.0 wt. percent, excellent magnetic properties can be obtained, i.e., the initial permeability $\mu_0$ of 87,300 and the maximum permeability $\mu_m$ of 379,000. On the other hand, with the molybdenum content in excess of 7.0 wt. percent, the forgeability and the rollability of the alloy are deteriorated. Thus, the molybdenum content is restricted to 0 to 7.0 wt. percent, preferably less than 4.0 wt. percent.

(5) Chromium=0 to 5.0 wt. percent (exclusive of 0%)

With the chromium content of 0 to 5.0 wt. percent, the initial permeability $\mu_0$ of 53,100 can be achieved, but with the chromium content of more than 5.0 wt. percent, the initial permeability $\mu_0$ and the maximum permeability $\mu_m$ becomes less than 3,000 and 5,000, respectively. Thus, the chromium content is restricted to 0 to 5.0 wt. percent. Further, the preferable range of the chromium content is less than 3.0 wt. percent.

(6) Tungsten=0 to 10.0 wt. percent (exclusive of 0%)

With the tungsten content of 0 to 10.0 wt. percent, the initial permeability $\mu_0$ shows the highest value of 72,500, but with the tungsten content in excess of 10.0 wt. percent, the initial permeability $\mu_0$ and the maximum permeability $\mu_m$ are reduced to less than 3,000 and 5,000, respectively. The excessively high tungsten content also results in the deterioration of the forgeability and the rollability of the alloy. Thus, the tungsten content is restricted to 0 to 10.0 wt. percent. Further, the preferable range of the tungsten content is less than 5.0 wt. percent.

(7) Vanadium=0 to 7.0 wt. percent (exclusive of 0%)

With the vanadium content of 0 to 7.0 wt. percent, excellent magnetic properties and high hardness can be obtained showing the highest initial permeability $\mu_0$ of 40,900. On the other hand, with the vanadium content in excess of 7.0 wt. percent, the forgeability and the rollability of the alloy are deteriorated. Thus, the vanadium content is restricted to 0 to 7.0 wt. percent. Further, the preferable range of the vanadium content is less than 4.0 wt. percent.

(8) Niobium=0 to 3.1 wt. percent (exclusive of 0%)

With the niobium content of 0 to 3.1 wt. percent, excellent magnetic properties can be obtained and forgeability and rollability can be improved, but with the niobium content in excess of 3.1 wt. percent, its effect is reduced. Accordingly, the niobium content is restricted to 0 to 3.1 wt. percent.

(9) Manganese=0 to 10.0 wt. percent (exclusive of 0%)

With the manganese content of 0 to 10.0 wt. percent, the initial permeability $\mu_0$ is 45,700 and excellent magnetic properties can be obtained. On the other hand, with the manganese content of more than 10.0 wt. percent, the initial permeability $\mu_0$ and the maximum permeability $\mu_m$ become less than 3,000 and less than 5,000, respectively. Thus, the manganese content is restricted to 0 to 10.0 wt. percent. Further, the preferable range of the manganese content is less than 5.0 wt. percent.

(10) Germanium=0 to 7.0 wt. percent (exclusive of 0%)

With the germanium content of 0 to 7.0 wt. percent, excellent magnetic properties can be obtained showing the highest initial permeability $\mu_0$ of 72,500. On the other hand, with the germanium content in excess of 7.0 wt. percent, the initial permeability $\mu_0$ and the maximum permeability $\mu_m$ become less than 3,000 and less than 5,000, respectively. Thus, the germanium content is restricted to 0 to 7.0 wt. percent. Further, the preferable range of the germanium content is less than 5.0 wt. percent.

(11) Titanium=0 to 5.0 wt. percent (exclusive of 0%)

With the titanium content of 0 to 5.0 wt. percent, excellent magnetic properties and high hardness can be obtained. On the other hand, with the titanium content in excess of 5.0 wt. percent, the initial permeability $\mu_0$ and the maximum permeability $\mu_m$ become less than 3,000 and 5,000, respectively. The excessively high titanium content also results in the deterioration of the forgeability and the rollability of the alloy. Thus, the titanium content is restricted to 0 to 5.0 wt. percent. It is more preferable to restrict it to less than 3.0 wt. percent.

(12) Zirconium=0 to 5.0 wt. percent (exclusive of 0%)

With the zirconium content of 0 to 5.0 wt. percent, excellent magnetic properties and high hardness can be obtained. On the other hand, with the zirconium content in excess of 5.0 wt. percent, the initial permeability $\mu_0$ and the maximum permeability $\mu_m$ become less than 3,000 and 5,000, respectively. Further, the forgeability and the rollability of the alloy also are deteriorated. Thus, the zirconium content is restricted to 0 to 5.0 wt. percent. The preferable range of the zirconium content is less than 3.0 wt. percent.

(13) Aluminum=0 to 5.0 wt. percent (exclusive of 0%)

With the aluminum content of 0 to 5.0 wt. percent, excellent magnetic properties and high hardness can be obtained. On the other hand, with the aluminum content in excess of 5.0 wt. percent, the initial permeability $\mu_0$ and the maximum permeability $\mu_m$ become less than 3,000 and 5,000, respectively. The excessively high aluminum content also results in the deterioration of the forgeability and the rollability of the alloy. Thus, the aluminum content is restricted to 0 to 5.0 wt. percent. The preferable range of the aluminum content is less than 3.0 wt. percent.

(14) Silicon=0 to 5.0 wt. percent (exclusive of 0%)

With the silicon content of 0 to 5.0 wt. percent, excellent magnetic properties and high hardness can be obtained. On the other hand, the silicon content in excess of 5.0 wt. percent, the initial permeability $\mu_0$ and the maximum permeability $\mu_m$ become less than 3,000 and 5,000, respectively, and further the forgeability and the rollability of the alloy are deteriorated. Thus, the silicon content is restricted to 0 to 5.0 wt. percent. The preferable range of the silicon content is less than 3.0 wt. percent.

(15) Tin=0 to 5.0 wt. percent (exclusive of 0%)

With the tin content of 0 to 5.0 wt. percent, excellent magnetic properties and high hardness can be obtained. On the other hand, with the tin content in excess of 5.0 wt. percent, the forgeability and the rollability of the alloy are deteriorated. Thus, the tin content is restricted to 0 to 5.0 wt. percent. The preferable range of the tin content is less than 3.0 wt. percent.

(16) Antimony=0 to 5.0 wt. percent (exclusive of 0%)

With the antimony content of 0 to 5.0 wt. percent, excellent magnetic properties and high hardness can be obtained. On the other hand, with the antimony content in excess of 5.0 wt. percent, the forgeability and the rollability are deteriorated. Thus, the antimony content is restricted to 0 to 5.0 wt. percent. The preferable range of the antimony content is less than 3.0 wt. percent.

(17) Cobalt=0 to 10.0 wt. percent (exclusive of 0%)

With the cobalt content of 0 to 10.0 wt. percent, excellent magnetic properties can be obtained. On the other hand, with the cobalt content in excess of 10.0 wt. percent, the initial permeability $\mu_0$ and the maximum permeability $\mu_m$ become less than 3,000 and 5,000 respectively. Thus, the cobalt content is restricted to 0 to 10.0 wt. percent. The preferable range of the cobalt content is less than 5.0 wt. percent.

(18) Copper=0 to 10.0 wt. percent (exclusive of 0%)

With the copper content of 0 to 10.0 wt. percent, excellent magnetic properties can be obtained. On the other hand, with the copper content in excess of 10.0 wt. percent, the initial permeability $\mu_0$ and the maximum permeability $\mu_m$ become less than 3,000 and 5,000, respectively. Thus, the copper content is restricted to 0 to 10.0 wt. percent. The preferable range of the copper content is less than 5.0 wt. percent.

Further, a total amount of the subingredients (4) to (18) is 0.01 to 10.0 wt. percent, because the alloy composition outside the aforesaid range results in the deterioration of the magnetic properties, the forgeability and the rollability of the alloy. Further, the content of subingredient of less than 0.01 wt. percent shows no addition effect.

In short, the alloy according to the invention consists of 60.2 to 85.0 wt. percent, preferably 70.0 to 80.0 wt. percent of nickel, 6.0 to 30.0 wt. percent, preferably 8.0 to 20.0 wt. percent of iron, and 3.1 to 23.0 wt. percent, preferably 6.0 to 17.0 wt. percent of tantalum, and further consists of at least one element, which total amount is 0.01 to 10.0 wt. percent, selected from the group consisting of 0 to 7.0 wt. percent, preferably 0 to 4.0 wt. percent of molybdenum, 0 to 5.0 wt. percent, preferably 0 to 3.0 wt. percent of chromium, 0 to 10.0 wt. percent, preferably 0 to 5.0 wt. percent of tungsten, 0 to 7.0 wt. percent, preferably 0 to 4.0 wt. percent of vanadium (or conventional ferro-vanadium available on the market instead of metallic vanadium), 0 to 3.1 wt. percent of niobium (or conventional ferro-niobium available on the market instead of metallic niobium), 0 to 10.0 wt. percent, preferably 0 to 5.0 wt. percent of manganese, 0 to 7.0 wt. percent, preferably 0 to 5.0 wt. percent of germanium, 0 to 5.0 wt. percent, preferably 0 to 3.0 wt. percent of titanium, 0 to 5.0 wt. percent, preferably 0 to 3.0 wt. percent of zirconium, 0 to 5.0 wt. percent, preferably 0 to 3.0 wt. percent of aluminum, 0 to 5.0 wt. percent, preferably 0 to 3.0 wt. percent of silicon, 0 to 5.0 wt. percent, preferably 0 to 3.0 wt. percent of tin, 0 to 5.0 wt. percent, preferably 0 to 3.0 wt. percent of antimony, 0 to 10.0 wt. percent, preferably 0 to 5.0 wt. percent of cobalt, and 0 to 10.0 wt. percent, preferably 0 to 5.0 wt. percent of copper (each being exclusive of 0%) as the subingredient, and an inevitable amount of impurities. An ingot of the alloy of the invention may be made by pouring a melt of the alloy into a suitable mold. The ingot may be shaped into a desired form by working it at a room temperature or at an elevated temperature, for instance by forging, rolling, drawing, swaging, or the like. After the shaping, the alloy is heat treated by heating it at a high temperature such as a temperature of more than 800° C., preferably higher than 1,100° C. but lower than the melting point, in hydrogen or a non-oxidizing atmosphere or in vacuo for at least 1 minute but not longer than 100 hours, and then cooling it to a room temperature at a cooling speed of from 100° C./second to 1° C./hour, preferably 10° C./second to 10° C./hour, depending on the alloy composition. For certain alloy compositions, the alloy may be reheated to a temperature below about 600° C., i.e., less than the order-disorder transformation point, for at least 1 minute but not longer than about 100 hours.

With such heat treatment, high permeability including an initial permeability of 87,300 and a maximum permeability of 379,000 can be obtained. In addition to the high permeability, the alloy according to the invention has a comparatively large specific resistivity and high hardness suitable for magnetic recording and reproducing heads; namely easy forgeability, rollability, drawability and swageability.

What is claimed is:

1. A high permeability and high hardness alloy for magnetic recording and reproducing heads, which alloy consists of 60.2 to 85.0 wt. percent of nickel, 6.0 to 30.0 wt. percent of iron and 3.1 to 23.0 wt. percent of tantalum as the main ingredient, and further consists of the total amount of 0.01 to 10.0 wt. percent of at least one element selected from the group consisting of 0 to 7.0 wt. percent molybdenum, 0 to 5.0 wt. percent of chromium, 0 to 10.0 wt. percent of tungsten, 0 to 7.0 wt. percent of vanadium, 0 to 3.1 wt. percent of niobium, 0 to 10.0 wt. percent of manganese, 0 to 7.0 wt. percent of germanium, 0 to 5.0 wt. percent of titanium, 0 to 5.0 wt. percent of zirconium, 0 to 5.0 wt. percent of aluminum, 0 to 5.0 wt. percent of silicon, 0 to 5.0 wt. percent of tin, 0 to 5.0 wt. percent of antimony, 0 to 10.0 wt. percent of cobalt and 0 to 10.0 wt. percent of copper as the subingredient, and an inevitable amount of impurities, characterized in that the alloy has the degree of order of 0.1 to 0.6, the Vickers hardness of more than 150, initial permeability of more than 3,000 and maximum permeability of more than 5,000.

References Cited

UNITED STATES PATENTS

| | | | |
|---|---|---|---|
| 1,873,155 | 8/1932 | Scharnow | 148—31.55 |
| 2,046,995 | 7/1936 | Austin | 75—170 |
| 2,921,850 | 1/1960 | Inouye et al. | 75—170 |
| 3,390,443 | 7/1968 | Gould et al. | 148—31.57 |

L. DEWAYNE RUTLEDGE, Primary Examiner

W. R. SATTERFIELD, Assistant Examiner

U.S. Cl. X.R.

75—170; 148—31.57, 121, 122